US012725498B2

(12) United States Patent
Saghiri

(10) Patent No.: US 12,725,498 B2
(45) Date of Patent: Sep. 1, 2026

(54) OBJECT IN-PAINTING IN A VIDEO STREAM

(71) Applicant: SiliconeSignal Technologies, Meknes (MA)

(72) Inventor: Khalid Saghiri, Meknes (MA)

(73) Assignee: SiliconeSignal Technologies, Meknes (MA)

( * ) Notice: Subject to any disclaimer, the term of this patent is extended or adjusted under 35 U.S.C. 154(b) by 0 days.

(21) Appl. No.: 19/259,652

(22) Filed: Jul. 3, 2025

(65) Prior Publication Data

US 2026/0057752 A1 Feb. 26, 2026

Related U.S. Application Data

(63) Continuation of application No. 18/049,806, filed on Oct. 26, 2022, now abandoned.

(51) Int. Cl.
*G08B 13/196* (2006.01)

(52) U.S. Cl.
CPC . *G08B 13/19613* (2013.01); *G08B 13/19608* (2013.01); *G08B 13/19665* (2013.01)

(58) Field of Classification Search
CPC ........ G08B 13/19613; G08B 13/19608; G08B 13/19665; G08B 13/19686; G06T 5/50; G06T 7/70
USPC .......................................................... 348/183
See application file for complete search history.

(56) References Cited

U.S. PATENT DOCUMENTS 9,406,131 B2 8/2016 Würmlin et al.
9,443,320 B1 9/2016 Gaidon et al.
9,530,221 B2 12/2016 Zhu et al.
10,949,978 B2 3/2021 Holzer et al.
11,004,209 B2 5/2021 Chen et al.
11,551,338 B2 * 1/2023 Safdarnejad .............. G06T 5/50
11,594,042 B1 * 2/2023 Sarti ...................... G06V 20/41
(Continued)

FOREIGN PATENT DOCUMENTS

EP 3518528 A1 7/2019

OTHER PUBLICATIONS

U.S. Appl. No. 18/049,804, Final Office Action mailed Jun. 26, 2025, 11 pgs.

(Continued)

*Primary Examiner* — Helen Shibru
(74) *Attorney, Agent, or Firm* — Polygon IP, LLP

(57) ABSTRACT

One or more objects in a video stream may be selectively in-painted. In-painting refers to the replacement of a portion of a frame or frames in a video stream with updated image data. In-painting may help to protect privacy by replacing an image of a person, document, password, or other sensitive imagery. Multiple object tracking may be used to track objects across different image frames as well as to determine and persist object identity information across the different image frames. In addition, a video stream may be analyzed to identify activities being performed in the video stream. Then, objects may be in-painted depending on factors such as the identity of the object (e.g., a particular person) and/or the activity or activities being performed. For example, a known individual performing a permitted activity may be in-painted, while an unknown individual performing a prohibited activity may not be in-painted.

20 Claims, 7 Drawing Sheets

(56) References Cited

U.S. PATENT DOCUMENTS

| | | | |
|---|---|---|---|
| 11,783,086 B2 | 10/2023 | Moloney | |
| 11,854,288 B2 | 12/2023 | Yamamoto et al. | |
| 11,935,214 B2 * | 3/2024 | Pan | G06F 18/2113 |
| 11,937,012 B2 | 3/2024 | Nakano et al. | |
| 11,941,887 B2 | 3/2024 | Sriram et al. | |
| 12,048,669 B2 | 7/2024 | Dialameh et al. | |
| 12,169,938 B2 * | 12/2024 | Cao | G06N 3/045 |
| 12,183,090 B2 | 12/2024 | Agarwal et al. | |
| 12,354,247 B1 * | 7/2025 | Ghosh | G06T 3/40 |
| 12,400,303 B2 * | 8/2025 | Frey | G06T 5/77 |
| 2007/0218440 A1 | 9/2007 | Delahunt et al. | |
| 2020/0082851 A1 * | 3/2020 | Chau | G11B 27/031 |
| 2020/0327465 A1 | 10/2020 | Baek et al. | |
| 2020/0380274 A1 | 12/2020 | Shin et al. | |
| 2020/0402243 A1 | 12/2020 | Benou et al. | |
| 2022/0253988 A1 | 8/2022 | Miles et al. | |
| 2023/0154195 A1 | 5/2023 | Agarwal et al. | |
| 2024/0144485 A1 * | 5/2024 | Saghiri | G06T 7/246 |
| 2024/0144795 A1 | 5/2024 | Saghiri | |
| 2024/0249342 A1 | 7/2024 | Malgarini et al. | |

OTHER PUBLICATIONS

U.S. Appl. No. 18/049,804, Non Final Office Action mailed Feb. 11, 2025, 14 pgs.
U.S. Appl. No. 18/049,806, Final Office Action mailed Apr. 2, 2024, 12 pgs.
U.S. Appl. No. 18/049,806, Non Final Office Action mailed Aug. 31, 2023, 8 pgs.
U.S. Appl. No. 18/049,806, Non Final Office Action mailed Aug. 12, 2024, 12 pgs.
U.S. Appl. No. 18/049,806, Restriction Requirement mailed May 8, 2025, 7 pgs.

* cited by examiner

OBJECT IN-PAINTING IN A VIDEO STREAM

CROSS-REFERENCE TO RELATED APPLICATIONS

This application is a continuation of and claims priority to U.S. patent application Ser. No. 18/049,806 by Khalid Saghiri, filed Oct. 26, 2022, titled "Object In-Painting in a Video Stream", which is hereby incorporated by reference in its entirety and for all purposes.

FIELD OF TECHNOLOGY

This patent application relates generally to computer vision, and more specifically to the editing of video data.

BACKGROUND

In many contexts, a video stream includes visual elements that may be undesirable. For example, security footage of the inside of a home may need to be reviewed by a service provider to identify or confirm a security issue such as the presence of an intruder. However, such security footage may also include sensitive imagery, such as images of home occupants, images of computer monitors or television screens, images of sensitive documents, and the like. Hence, home occupants may desire the security associated with active video monitoring but may nevertheless desire a level of privacy inconsistent with conventional active video monitoring.

One approach to such a problem is object in-painting, in which a video stream is edited to remove, replace, or alter the appearance of an object represented in the video stream. However, conventional approaches for object in-painting suffer from numerous drawbacks. Accordingly, improved techniques for object in-painting in a video stream are desired.

SUMMARY

Various embodiments of techniques and mechanisms described herein provide for systems, methods, devices, and computer-readable media having instructions stored thereon for in-painting objects in video streams. In some embodiments, two or more object tracks from a plurality of object tracks may be determined for a bounding box around an object by applying two or more object tracking models to a designated frame of a plurality of frames within a video stream. Each of the two or more object tracks may identify a correspondence between bounding boxes for the object across different ones of the plurality of frames. The designated object track may be selected from the two or more object tracks when it is determined that the designated object track meets one or more criteria. A replacement image for the bounding box may be determined. The video stream may be updated to replace the designated frame with a replacement frame. In the replacement frame, portion of the designated frame corresponding with the bounding box may be replaced with the replacement image.

In some embodiments, an activity being performed in the designated frame may be identified. A message triggering an alarm may be transmitted when the activity being performed meets one or more alarm criteria.

In some embodiments, an object recognition algorithm may be applied to the designated frame to identify an object associated with the bounding box. The object recognition algorithm may involve determining an object identifier associated with the bounding box.

In particular embodiments, a determination may be made as to whether each of the two or more object tracks is associated with a respective object identifier, and/or as to whether to perform partial in-painting of the designated frame. The replacement image may be determined when it is determined to perform partial in-painting of the designated frame.

In some implementations, an activity being performed in the designated frame may be identified. A determination may be made, based at least in part on the identified activity, as to whether to prioritize security over privacy for the designated frame. The replacement image may be determined when it is determined to not to prioritize security over privacy.

In some embodiments, a plurality of raw performance metrics may be determined based at least in part on one or more visual features within the designated frame. Each of the raw performance metrics may correspondto a respective one of the two or more object tracking models. The designated object track may be selected based at least in part on the plurality of raw performance metrics.

In some embodiments, the video stream may be a live video stream captured by a camera. The video stream may include audio data, and the designated object track may be selected at least in part based on one or more characteristics of the audio data.

In some implementations, updating the video stream may involve storing an updated video stream on a storage device. Alternatively, or additionally, updating the video stream may involve transmitted an updated video stream to a remote computing device via a network.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods, and computer program products for object in-painting in a video stream. These drawings in no way limit any changes in form and detail that may be made by one skilled in the art without departing from the spirit and scope of the disclosed implementations.

DETAILED DESCRIPTION

Figure 1:
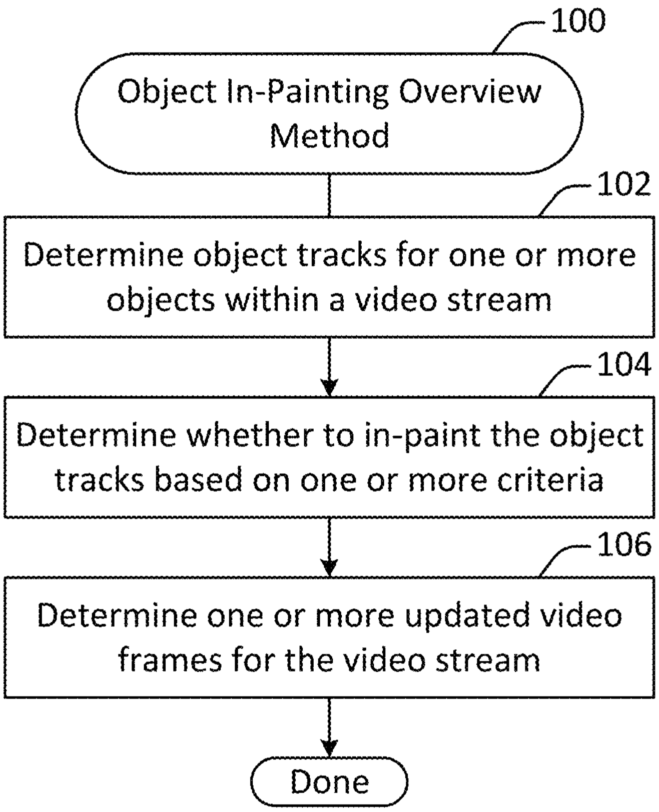
FIG. 1 illustrates an overview method for object in-painting in a video stream, performed in accordance with one or more embodiments.

Techniques and mechanisms described here provide for the in-painting of one or more objects in a video stream.

In-painting refers to the replacement of a portion of a frame or frames in a video stream with updated image data. In-painting may help to protect privacy by replacing an image of a person, document, password, or other sensitive imagery. Multiple object tracking may be used to track objects across different image frames as well as to determine and persist object identity information across the different image frames. In addition, a video stream may be analyzed to identify activities being performed in the video stream. Then, objects may be in-painted depending on factors such as the identity of the object (e.g., a particular person) and/or the activity or activities being performed. For example, a known individual performing a permitted activity may be in-painted, while an unknown individual performing a prohibited activity may not be in-painted.

According to various embodiments, object in-painting may involve the tracking of one or more objects across multiple video frames. When applying multiple object tracking, two or more different models may be separately applied to track an object across multiple video frames. A model may be dynamically evaluated for a frame or group of frames by determining a performance metric for the model, for instance on the level of a frame or group of frames. Then, two or more models may be fused together using a weighting scheme based at least in part on performance metrics for the different models.

Different models may be more or less suitable for tracking different types of objects and/or tracking objects in different situations. Accordingly, many conventional MOT techniques involve stacking or fusing different models. However, fusing is typically performed in a static fashion by using averages and other fixed combination techniques. The performance of static fusing methods is very poor in complex situations that involve challenges such as occlusions, variable scene illumination, nonlinear motion, frequent entries and exits of objects. The poor performance of these models is reflected by issues such as frequent object ID switching and lost tracks.

In contrast to conventional techniques, techniques and mechanisms described herein provide for a dynamic fusing approach in which the use of models is tailored depending on the context. Such techniques and mechanisms allow the use of two or more models for tracks construction by matching the detected objects in the current frame to their corresponding tracks (i.e. the set of positions of the detected object in the previous frames).

In some implementations, the use or not of a given model as well as the determination of the importance of a given model among the set of used models may be dynamically determined (e.g., at each frame), for instance by evaluating how appropriate the model's performance is to the matching task for the current frame. The appropriateness of a given model may be determined at least in part using information about the situations where the model tends to perform well or poorly. Such information may be coded as a metric that is used to dynamically compute (e.g., at each frame) the weight of the model attached to it.

According to various embodiments, two or more models for object tracking may be combined based on their expected performance. For example, object tracking may involve the application of both an appearance model and a motion model. For each frame or group of frames, the expected performance of the appearance model and the motion model may each be determined. An appropriate performance metric for the appearance model may depend on the degree of similarity between the objects of the same frame, using for instance the cosine similarity between the vectors encoding the appearance of the objects. An appropriate metric for the motion model may depend on the degree of crowdedness of the scene, using for instance the distance between the centroids of the bounding boxes.

In some embodiments, a model weight may be determined based on the performance metric. For example, a performance metric may measure a negative impact, in which case a model weight may be inversely proportional to the metric. That is, the higher the metric, the lower the weight. In the example discussed in the previous paragraph, increased similarity between objects of the same frame may lower the weight of the appearance model, while increased crowdedness may lower the weight of the motion model.

According to various embodiments, techniques and mechanisms described herein may allow for any suitable number of models to be aggregated into a single procedure in which models receive higher weights when they positively impact object tracking precision and lower weights when they do not. Further, the system may support various types and combinations of metrics for different models.

Object tracking is a fundamental aspect of many video processing systems, such as surveillance systems. Accordingly, embodiments of techniques and mechanisms described herein may improve the functioning of such systems by providing for increased object tracking precision. Such improvements may manifest as a lower error rate when tracking objects across frames in a video stream.

FIG. 1 illustrates an overview method 100 for object in-painting, performed in accordance with one or more embodiments. According to various embodiments, the method 100 may be performed at any suitable computing device. For example, the method 100 may be performed at a surveillance system configured to control one or more cameras. As another example, the method 100 may be performed at a smart camera, or at a computing device that receives data from a camera.

Object tracks for one or more objects within a video stream are determined at 102. According to various embodiments, determining object tracks may involve operations such as determining a bounding box for an object. The term "bounding box" refers to a region of an image that defines a location of an object. In some embodiments, the bounding box may be rectangular. Alternatively, or additionally, non-rectangular bounding boxes may be used.

According to various embodiments, a bounding box may be determined by applying one or more of a variety of suitable image processing procedures to the frame. For example, an object detection algorithm may be applied to the frame. The object detection algorithm may identify a region of an image that corresponds to a particular object. Object detection may rely, for instance, on identifying lines, corners, shapes, and/or other low-level features. Alternatively, or additionally, object detection may rely on pattern recognition algorithms that identify objects such as human beings, animals, or vehicles based on characteristics common to these types of objects.

According to various embodiments, object tracks for the bounding box may be determined by applying two or more object tracking models to the video stream. Various types of tracking models may be used. For instance, an appearance tracking model may track objects based on their visual characteristics, while a motion tracking model may track objects based on their location within the frame.

In some implementations, a respective performance metric for each of the two or more object tracking models may be determined. An object tracking model may be associated with a performance metric that indicates a predicted performance level for the object tracking model under a particular set of conditions. For example, a performance metric may depend on characteristics such as the crowdedness of a frame.

In some embodiments, a designated object track may be selected for the bounding box from the two or more object tracks. According to various embodiments, the designated object track may be selected based at least in part on the performance metrics. For example, the designated object track may be selected by weighting the tracks based on the performance metrics associated with the object models that produced the tracks, and then selecting the object tracking having the highest weight. Additional details regarding the determination and storage of object tracks for objects in a video stream are discussed with respect to the methods 200, 300, and 400 shown in FIG. 2, FIG. 3, and FIG. 4.

A determination is made at 104 as to whether to in-paint the object tracks based on one or more selection criteria. According to various embodiments, the determination may involve, for instance, identifying whether a bounding box in a video stream is associated with an object associated with one or more security or privacy considerations. Additional details regarding the determination as to whether to in-paint an object track are discussed with respect to the method 600 shown in FIG. 6.

One or more updated video frames for the video stream are determined at 106. According to various embodiments, determining an updated video stream may involve editing a video stream to replace, remove, or alter an object within the video stream. For example, an object may be removed, blurred, or replaced with an image mask. Additional details regarding the in-painting of an object in a video frame are discussed with respect to the method 700 shown in FIG. 7.

Figure 2:
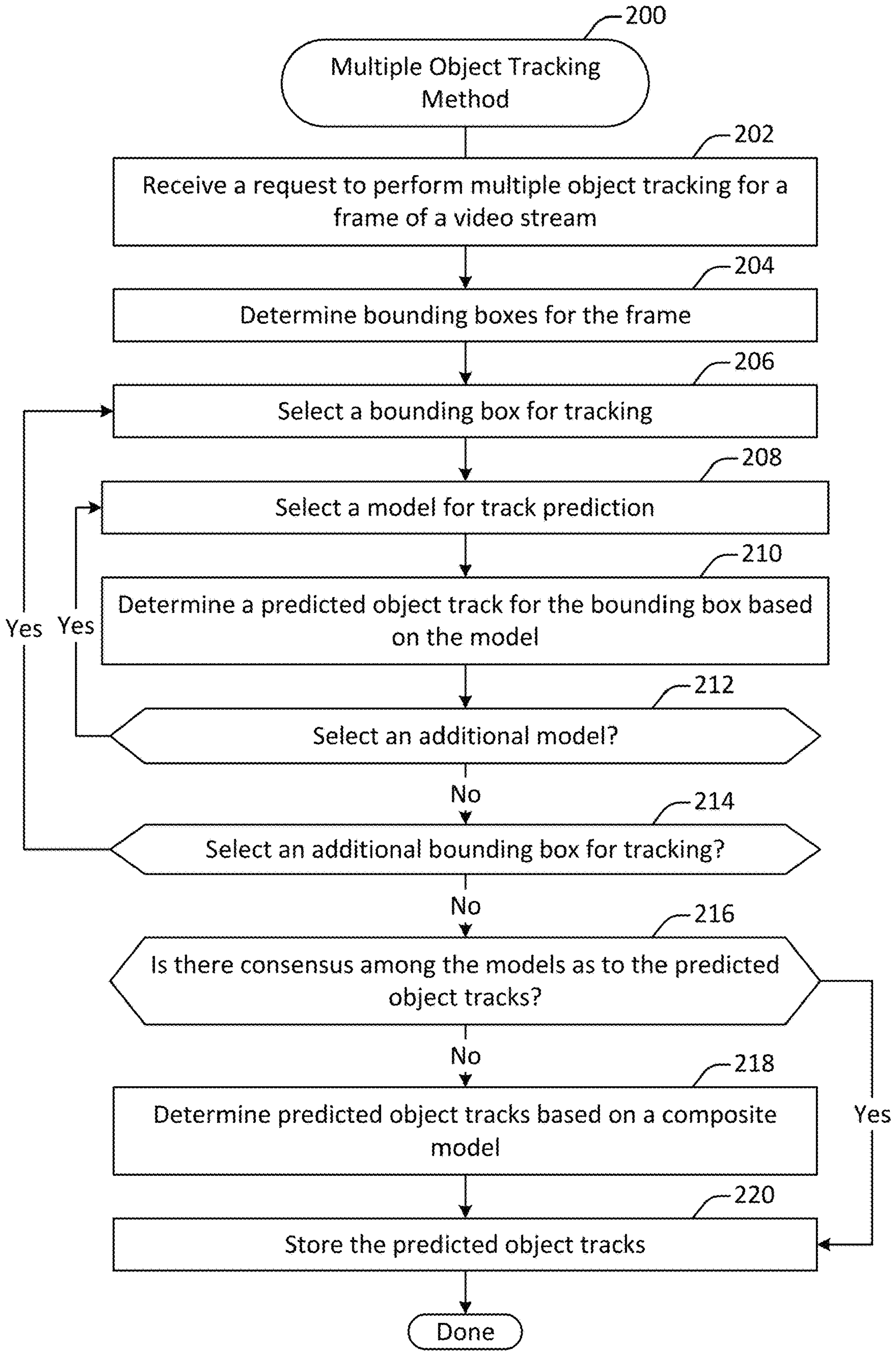
FIG. 2 illustrates a method for multiple object tracking, performed in accordance with one or more embodiments.

FIG. 2 illustrates a method 200 for multiple object tracking, performed in accordance with one or more embodiments. According to various embodiments, the method 200 may be performed on a computing device such as the device 500 shown in FIG. 5.

A request to perform multiple object tracking for a frame of a video stream is received at 202. In some embodiments, the request may be generated manually, for instance based on user input. Alternatively, the request may be generated automatically and/or dynamically. For instance, the request may be generated as part of a larger video analysis methodology, such as a video in-painting process in which objects are removed from a video stream.

In particular embodiments, the method 200 may be performed for each successive frame in a video stream. Alternatively, the method 200 may be performed periodically. For example, the method 200 may be performed for key frames within a video stream. As another example, the method 200 may be performed at a given rate, such as once per every five frames.

One or more bounding boxes for the frame are determined at 204. According to various embodiments, bounding boxes for a frame may be determined via any of a variety of suitable methods. For instance, bounding boxes may be determined via logistic regression, histogram of oriented gradient (HOG), convolutional neural network (CNN), region-based convolutional neural networks (R-CNN), single-shot detector, You Only Look Once (YOLO), or any suitable bounding box detection procedure.

A bounding box is selected for tracking at 206. A model for track prediction is selected at 208. According to various embodiments, bounding boxes and models may be selected for analysis in any suitable order. For example, bounding boxes and models may be selected for analysis in a predefined sequence, in parallel, or according to another ordering.

A predicted object track is determined for the bounding box at 210 based on the model. According to various embodiments, any of a variety of object tracking models may be employed. For example, multiple object tracking may involve motion models, appearance models, other models, or some combination thereof. Examples of such models may include, but are not limited to: Generic Object Tracking Using Regression Networks (GOTURN), Recurrent You Only Look Once (ROLO), Simple Online Real-Time Tracker (SORT), DeepSORT, SiamMask, Joint Detection and Embedding (JDE), and Tracktor++. Techniques and mechanisms described herein are consistent with the group of different models identified above, other models, and/or different instances of the same model trained or parameterized in different ways.

A determination is made at 212 as to whether to select an additional model. If an additional model is not selected, then at 214 a determination is made as to whether to select an additional bounding box for tracking. According to various embodiments, the process many continue until all bounding boxes selected at 206 and models used for track prediction have been identified.

A determination is made at 216 as to whether there is consensus among the models as to the predicted object tracks. According to various embodiments, the determination may involve identifying a correspondence between bounding boxes and object tracks for each model, and then determining whether those correspondences are the same across each models.

In some implementations, a determination may be made as to whether a partial consensus exists. In a partial correspondence, all models may agree on a correspondence between bounding box and track for one or more of the bounding boxes, while also disagreeing on a correspondence between bounding box and track for a different one or more of the bounding boxes. In such a configuration, the agreed upon tracks may be employed for the bounding box or boxes where a consensus exists, and a composite model may be used to determine predicted object tracks for bounding boxes where no such consensus exists.

If consensus does not exist, then at 218 predicted object tracks are determined based on a composite model. Additional details related to the determination of predicted object tracks are discussed with respect to the method 300 shown in FIG. 3.

The predicted object tracks are stored at 220. Additional details related to the storage of predicted object tracks are discussed with respect to the method 400 shown in FIG. 4.

According to various embodiments, the operations shown in FIG. 200 may be performed in an order different than that shown. For example, operations 206 and 208 may performed in the reverse order, as well as operations 212 and 214.

Figure 3:
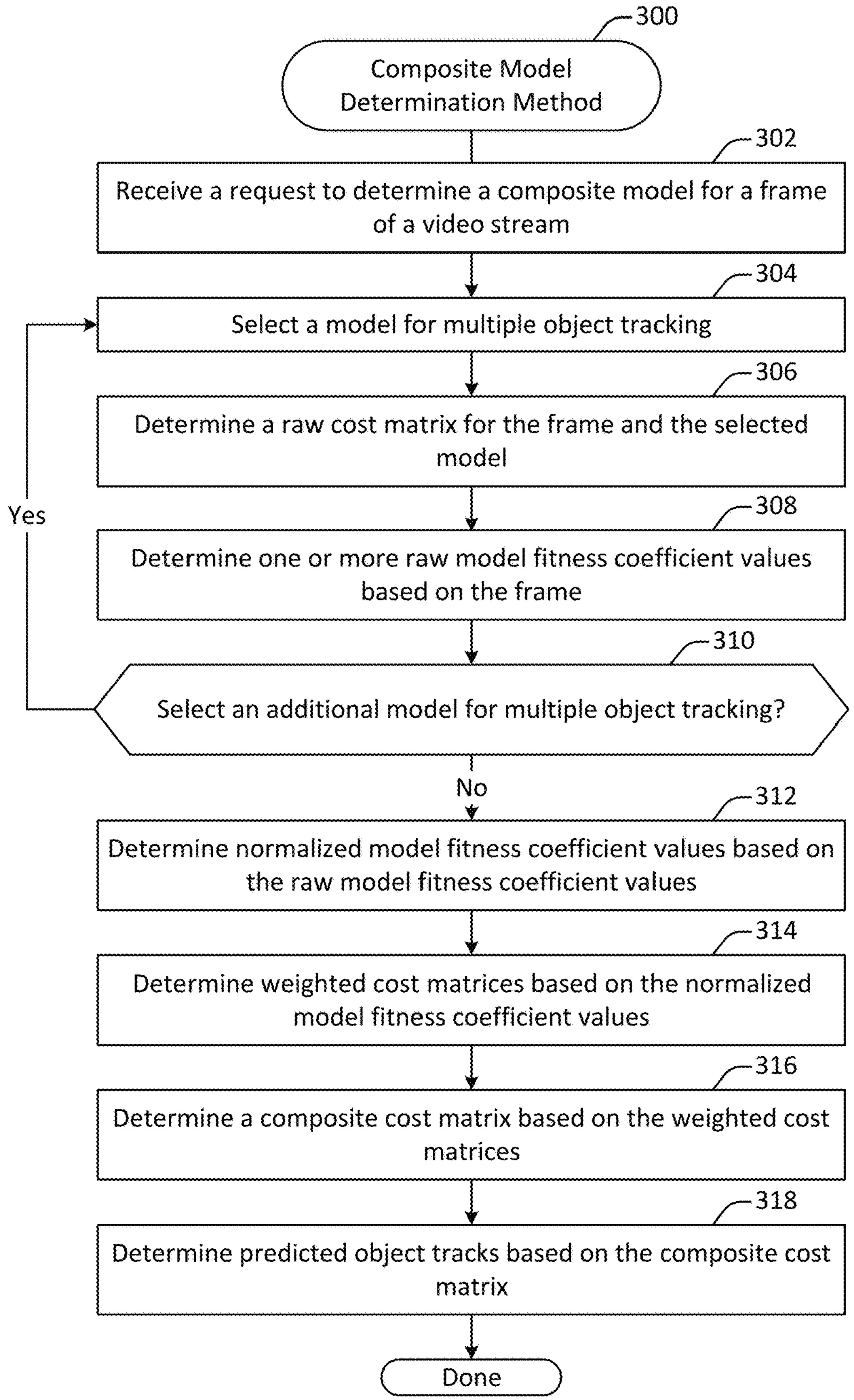
FIG. 3 illustrates a method for determining a composite model, performed in accordance with one or more embodiments.

FIG. 3 illustrates a method 300 for determining a composite model, performed in accordance with one or more embodiments. According to various embodiments, the method 200 may be performed on a computing device such as the device 500 shown in FIG. 5.

A request to determine a composite model for a frame of a video stream is received at 302. According to various embodiments, the request may be generated as part of a multiple object tracking procedure. For instance, the request may be generated as discussed with respect to the operation 208 shown in FIG. 2, when different models disagree as to the object track for one or more bounding boxes.

A model is selected for multiple object tracking at 304. According to various embodiments, any and all methods employed during the performance of the method 200 shown in FIG. 2 may be selected. For instance, models may be selected where there was at least some disagreement as to the object track for at least one bounding box. Models may be selected in any suitable order. For instance, models may be selected in sequence, in parallel, or in accordance with a pre-determined ordering.

A raw cost matrix for the frame is determined at 306 using the selected model. According to various embodiments, a raw cost matrix may identify a distance between one or more bounding boxes included in a current frame and one or more bounding boxes of existing tracks. That is, a value corresponding with row i and column j of a raw cost matrix may identify a distance between bounding box i in the current frame and a bounding box in existing track j, for a particular model.

According to various embodiments, any of various approaches may be used to calculate the distance values. For example, a distance value may be calculated using a cosine similarity measure as applied to a vector representation of the bounding boxes. As another example, a distance measure may be calculated as an intersection over union that identifies the area of overlap between the two bounding boxes as a portion of the union of the two bounding boxes. A similarity measure may be determined as, for instance, a distance value subtracted from one.

An existing track may be associated with more than one bounding box, for instance corresponding with different frames of a track. Accordingly, a similarity value between an existing track and a bounding box of the current frame may be determined in any of various ways. For example, the similarity value may be determined based on the maximum similarity of the bounding box of the current frame with any bounding box associated with the existing track. For instance, such an approach may be appropriate when employing an appearance model. As another example, the similarity value may be determined based on the similarity between the bounding box associated with the current frame and the bounding box for an existing track associated with an immediately preceding frame. For instance, such an approach may be appropriate when employing a motion model.

One or more raw model fitness coefficient values are determined at 308 based on the frame. In some embodiments, a raw model fitness coefficient value may indicate a quality or fitness of a particular model when applied to the current frame, as estimated or predicted based at least in part on one or more characteristics of the current frame.

According to various embodiments, a raw model fitness coefficient value may be determined based on the cost matrix. The raw model fitness coefficient value may be determined in a model-specific way. For example, the raw model coefficient value may be based on appearance similarity for an appearance model. As another example, the raw model coefficient value may be based on crowdedness for a motion frame. For instance, crowdedness may be determined based on, for instance, factors such as the number, size, and proximity of bounding boxes within the frame.

In particular embodiments, a raw model fitness coefficient value and/or a raw cost matrix may be determined for a set of temporally proximate frames rather than for an individual frame. In this way, temporal changes in a video stream may be smoothed across multiple frames.

A determination is made at 310 as to whether to select an additional model for multiple object tracking. According to various embodiments, as discussed with respect to operation 304, models may be analyzed in any suitable order, in sequence or in parallel.

Normalized model fitness coefficient values are determined at 312 based on the raw model fitness coefficient values. According to various embodiments, the normalized model fitness coefficient values may be determined by scaling the raw model fitness coefficient values determined at 308 to a common scale. For example, the raw model fitness coefficient values may each be scaled to a value between zero and one.

Weighted cost matrices are determined at 314 based on the normalized model fitness coefficient values. In some embodiments, a weighted cost matrix may be determined by multiplying the values within a raw cost matrix for a model by the normalized model fitness coefficient value for that model.

A composite cost matrix is determined at 316 based on the weighted cost matrices. According to various embodiments, the composite cost matrix may be determined by combining the weighted cost matrices according to a combination function. For instance, the weighted cost matrices may be added together. In this way, each value of the composite cost matrix may represent a distance between a bounding box in the current frame and an existing track that reflects the input of all models, weighted based on the quality of each model for the frame as determined based on the model fitness coefficient values.

Predicted object tracks are determined at 318 based on the composite cost matrix. In some embodiments, a predicted object track for a bounding box may be determined based on which existing track is associated with the lowest cost in the composite cost matrix. Alternatively, or additionally, one or more other selection criteria may be used. For example, a restriction that different bounding boxes may not be associated with the same existing track may be imposed. As another example, the composite cost matrix may be analyzed to identify a one-to-one correspondence between bounding boxes and tracks, for instance the correspondence having the small total cost.

Figure 4:
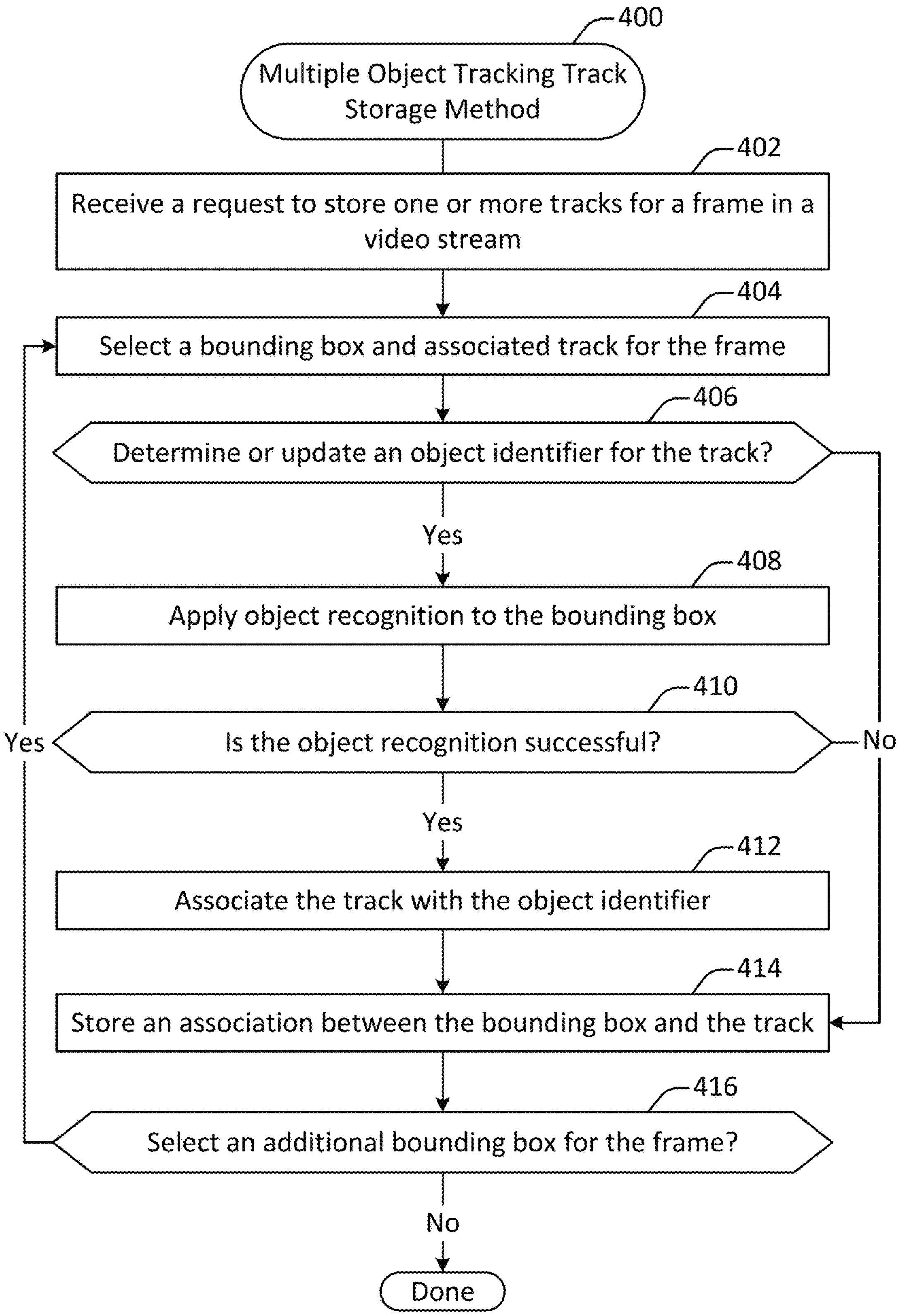
FIG. 4 illustrates a method for storing one or more object tracks, performed in accordance with one or more embodiments.

FIG. 4 illustrates a method 400 for storing one or more object tracks, performed in accordance with one or more embodiments. According to various embodiments, the method 400 may be performed to store an object track in association with a bounding box, after such an association is determined as discussed with respect to the methods 200 and 300 shown in FIGS. 2 and 3. The method 200 may be performed on a computing device such as the device 500 shown in FIG. 5.

A request to store one or more object tracks for a frame in a video stream is received at 402. In some implementations, the request may be generated as discussed with respect to the operation 220 shown in FIG. 2.

A bounding box and associated track for the frame are selected at 404. According to various embodiments, the track for a bounding box in a frame may be determined as discussed with respect to the methods 200 and 300 as shown in FIGS. 2 and 3.

A determination is made at 406 as to whether to update an object identifier for the track. According to various embodiments, each track may be associated with one or more identifiers that identify an object associated with the track. An identifier may identify any suitable information that may be associate with a track. For example, an identifier may indicate that the track corresponds to a person, an animal, or another type of object. As another example, an identifier may indicate that a track corresponds to a particular person, a particular animal, or a particular object. As yet another example, an identifier may indicate that a track corresponds to a particular type of person or object. For instance, a type of person in a video stream associated with a video surveillance application may be a home occupant, an intruder, or an unidentified individual.

According to various embodiments, any of various criteria may be used to determine whether to update an object identifier for a track. For example, an object identifier for a track may be determined if the track is not yet associate with an object identifier. As another example, object identification may be performed on a track periodically, such as every 30 frames. As yet another example, object identification may be performed on a track if a confidence value associated with object identification for the track is below a designated threshold. The particular criteria for use in determining whether to update an object identifier may be strategically determined based on the application.

Object recognition is applied to the bounding box at 408. According to various embodiments, one or more of any suitable object recognition algorithm may be applied to the bounding box and/or to the frame to recognize the object. For example, a person recognition algorithm may be applied to distinguish humans from other moving objects. As another example, a face recognition algorithm may be applied, for instance to distinguish occupants of a home from other individuals.

In particular embodiments, an object recognition algorithm may receive as input not only a particular frame and/or bounding box within a frame, but also other information. For instance, the algorithm may receive as input one or more other images of the object, such as image data from previous frames in the video stream.

A determination is made at 410 as to whether object recognition was successful. The determination may be made based at least in part on the output from the object recognition algorithm or algorithms applied at operation 408.

In some implementations, the determination made at operation 410 may be non-binary. For instance, the output of an object recognition algorithm may identify not a single object, but rather one or more objects that are each associated with a respective confidence value. As another example, different object recognition algorithms may identify different objects. In such a situation, an object track may be associated with more than object identifier. Alternatively, or additionally, an object identifier may be associated with metadata such as a confidence value.

The track is associated with the object identifier at 412. An association between the bounding box and the track is stored at 414. According to various embodiments, such associations may be stored in transient memory, in a non-transitory storage medium, in a network-accessible storage location, or in any other suitable way.

A determination is made at 416 as to whether to select an additional bounding box for the frame. According to various embodiments, additional bounding boxes may be selected until all bounding boxes in the frame have been processed. As discussed with respect to the operation 404, bounding boxes may be analyzed in parallel or in sequence, and in any suitable order.

Figure 5:
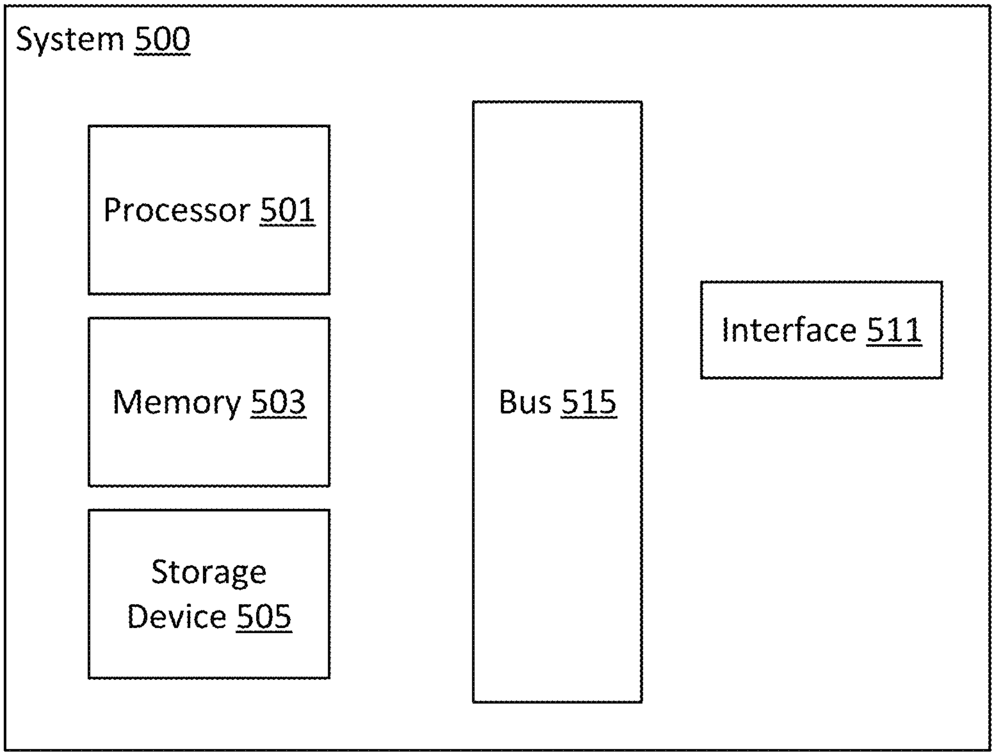
FIG. 5 illustrates one example of a computing device, configured in accordance with one or more embodiments.

FIG. 5 illustrates one example of a computing device 500, configured in accordance with one or more embodiments. According to various embodiments, a system 500 suitable for implementing embodiments described herein includes a processor 501, a memory module 503, a storage device 505, an interface 511, and a bus 515 (e.g., a PCI bus or other interconnection fabric.) System 500 may operate as variety of devices such as an application server, a database server, or any other device or service described herein. Although a particular configuration is described, a variety of alternative configurations are possible. The processor 501 may perform operations such as those described herein. Instructions for performing such operations may be embodied in the memory 503, on one or more non-transitory computer readable media, or on some other storage device. Various specially configured devices can also be used in place of or in addition to the processor 501. The interface 511 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 6:
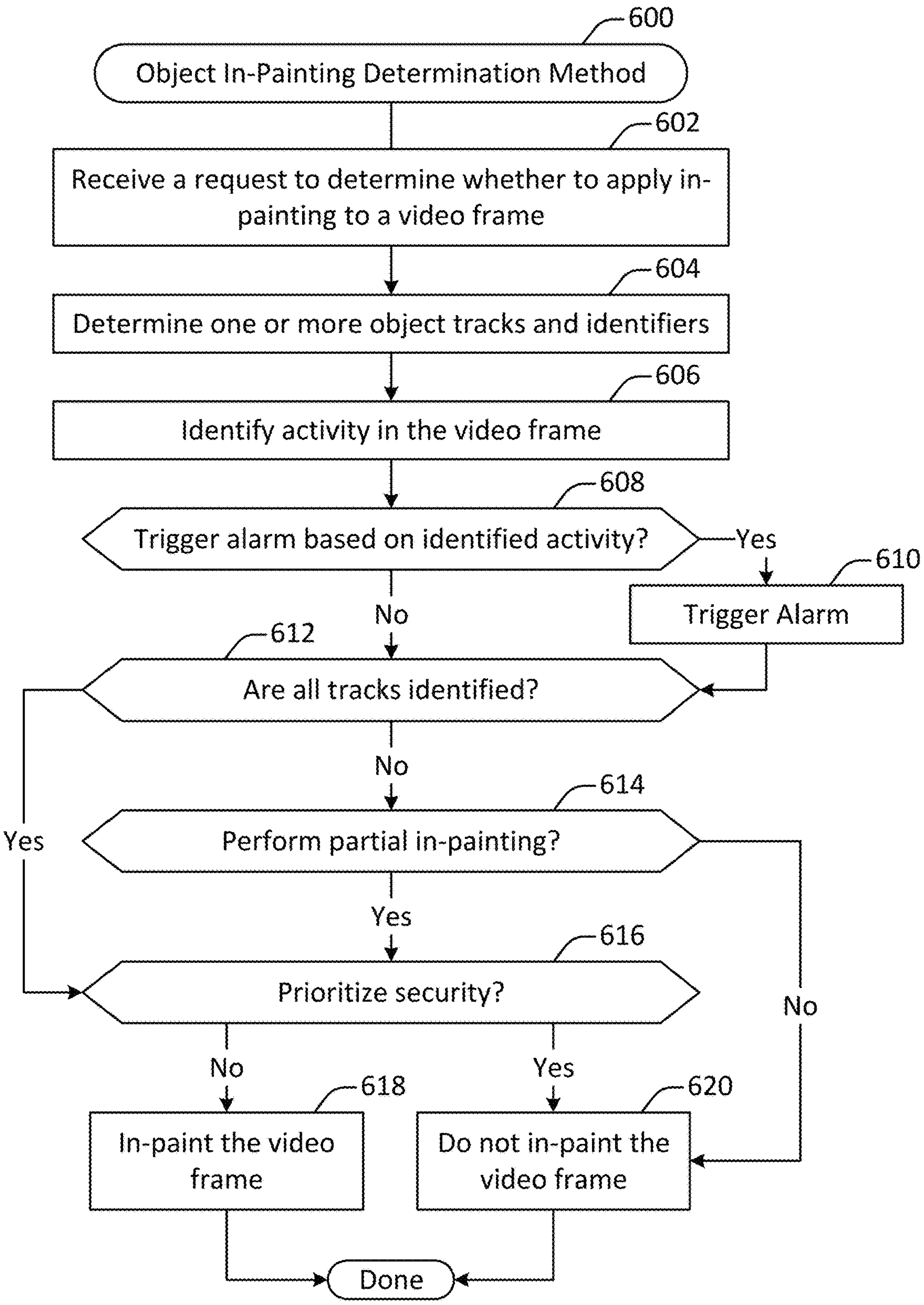
FIG. 6 illustrates an method for determining whether to apply object in-painting in a video stream, performed in accordance with one or more embodiments.

FIG. 6 illustrates a method 600 of determining whether to in-paint a video frame, performed in accordance with one or more embodiments. According to various embodiments, the method 600 may be performed at any suitable computing device. The method 600 may be performed in conjunction one or more of the methods 100, 200, 300, and 400 shown in FIG. 1, FIG. 2, FIG. 3, and FIG. 4. For example, a video stream may be analyzed to track and identify objects across different video frames. The output of multiple object tracking may then be provided to the method 600 to facilitate determining which, if any, of the object tracks should be in-painted.

A request to determine whether to apply in-painting to a video frame is received at 602. According to various embodiments, the request may be received at any suitable computing device configured for video stream monitoring. For example, the request may be received at a local computing device configured to perform in-painting on a video surveillance stream prior to sending it to a remote location for storage, further monitoring, or some other purpose. As another example, the request may be received at a cloud computing device configured to perform in-painting on a video stream prior to storing the video stream. As yet another example, the request may be received at a computing device configured to pre-process a video stream prior to making the video stream available for manual review by humans.

One or more object tracks and identifiers are determined at 604. According to various embodiments, object tracks and identifiers may be determined as discussed herein, such as with respect to the methods 200, 300, and 400 shown in FIG. 2, FIG. 3, and FIG. 4.

Activity in the video frame is identified at 606. In some embodiments, identifying activity in the video frame may involve pose estimation. For example, pose estimation may be used to determine that one or more humans are engaged in intimate or private activities. As another example, pose estimation may be used to determine that a human is in need of assistance, for instance if a human appears to be arranged in an unusual pose such as lying on the floor. As yet another example, pose estimation may be used to determine that a human is engaged in impermissible activities, such as burglary.

In some implementations, identifying activity in the video frame may involve analyzing the appearance of objects. For example, appearance analysis may indicate whether a person is dressed, undressed, or partially dressed, which may shed light on their activities.

In some embodiments, identifying activity in the video frame may involve analyzing optical flow between frames or other types of temporal features. For example, optical flow may indicate whether a person is stationary or mobile, which may provide an indication as to their activities.

In some embodiments, identifying activity in the video frame may involve analyzing spatial relationships between objects. For example, the location in space of two humans relative to one or more another may shed light on whether they are engaged in intimate or private activities.

In some embodiments, a video stream may include or be captured in conjunction with types of sensor data in addition to visual data. Such data may include, but is not limited to: sound data, vibration data, depth data captured from one or more depth sensors, motion detector data, light sensor data, and security system data. For example, sound data may be used to determine that a human is engaged in intimate activities, in need of medical assistance, or engaged in physical conflict.

In particular embodiments, more than one type of activity analysis may be combined. For example, static pose analysis for a single frame may be combined with optical flow analysis to evaluate how a person's pose changes from frame to frame. Such changes may provide additional information about the type of activity the person is engaged in. As another example, auditory analysis may be combined with any of a variety of visual processing techniques to aid in a determination as to whether a person is engaged in a private activity or an illegal activity, or is in need of medical or other types of assistance.

A determination is made at 608 as to whether to trigger an alarm based on the identified activity. According to various embodiments, various types of criteria may be used to trigger an alarm. For example, an alarm may be triggered if illegal activity is detected. Such activity may include, but is not limited to: the presence of an intruder in a private location, violence perpetrated by a person, theft of items within a commercial environment, or any other type of illegal activities. As another example, an alarm may be triggered if a threat to human or animal health is detected. Such activity may include, but is not limited to: violence against a person or animal, an indication that a person or animal has suffered an accident or medical emergency, the presence of environmental conditions likely to pose a threat to human or animal well-being, or any other type of threat. As yet another example, any other suitable triggering conditions may be used. Such conditions may include, but are not limited to: the presence or absence of a human or animal in a particular location, the detection of a particular environmental condition, and the presence or absence of a particular object or objects in an environment. In particular embodiments, a combination of conditions may be employed, for instance join together by Boolean logic.

If a determination is made to trigger an alarm, then the alarm is triggered at 610. According to various embodiments, triggering the alarm may involve one or more of a variety of operations. Such operations may involve sending one or more messages to trigger a visual or audible alarm, to inform a user, to alert emergency personnel, and/or to effect another type of result.

A determination is made at 612 as to whether all tracks are identified. According to various embodiments, the determination may be made at least in part on the object tracks and identifiers determined at 604. Various types of criteria may be used. For example, all tracks may be considered identified if each bounding box within the video frame is associated with an object track. As another example, all tracks may be considered identified if each bounding box within the video frame is associated with an object identifier.

If one or more tracks are not identified, then at 614 a determination is made as to whether to perform partial in-painting. In some embodiments, the determination as to whether to perform partial in-painting may be made based at least in part on one or more configuration parameters. For instance, in some configurations, partial in-painting may be disallowed.

In some implementations, the determination as to whether to perform partial in-painting may be made based at least in part on the activity identified at 606. For example, particular types of activities may be deemed particularly sensitive from a privacy standpoint and hence subject to partial in-painting, while in the absence of particularly sensitive activities partial in-painting may be disallowed.

In some embodiments, the determination as to whether to perform partial in-painting may be made based at least in part on an identification confidence value associated with one or more of the object tracks. For example, if one or more object tracks are identified with a high degree of confidence, then in-painting may be more likely to be performed than if one or more object tracks are identified with a low degree of confidence.

A determination is made at 616 as to whether to prioritize security. According to various embodiments, the determination as to whether to prioritize security may be made based at least in part on the activity identified at 606. For example, if an activity is identified as being potentially dangerous or illegal, then security may be prioritized over privacy. Such situations may be moderated by, for instance, a confidence level associated with the identification of the activity.

In some embodiments, the determination as to whether to prioritize security may be made based at least in part on one or more configuration parameters. For instance, in some configurations, one or more configuration parameters may indicate a degree of sensitivity to security considerations. As one example, a video stream from the inside of a business may be more likely to prioritize security over privacy, while a video stream from the inside of a house may be more likely to set a higher threshold for protecting privacy.

In particular embodiments, the triggering of an alarm may affect the decision to prioritize security. For instance, security may automatically be prioritized over privacy whenever an alarm is triggered.

At 618, if security is prioritized or if partial in-painting is not performed, then the video frame is not in-painted. Alternatively, if security is not prioritized and if all tracks are identified or if partial in-painting is allowed, then at 620 the video frame is in-painted. Additional details regarding video frame in-painting are discussed with respect to the method 700 shown in FIG. 7.

Figure 7:
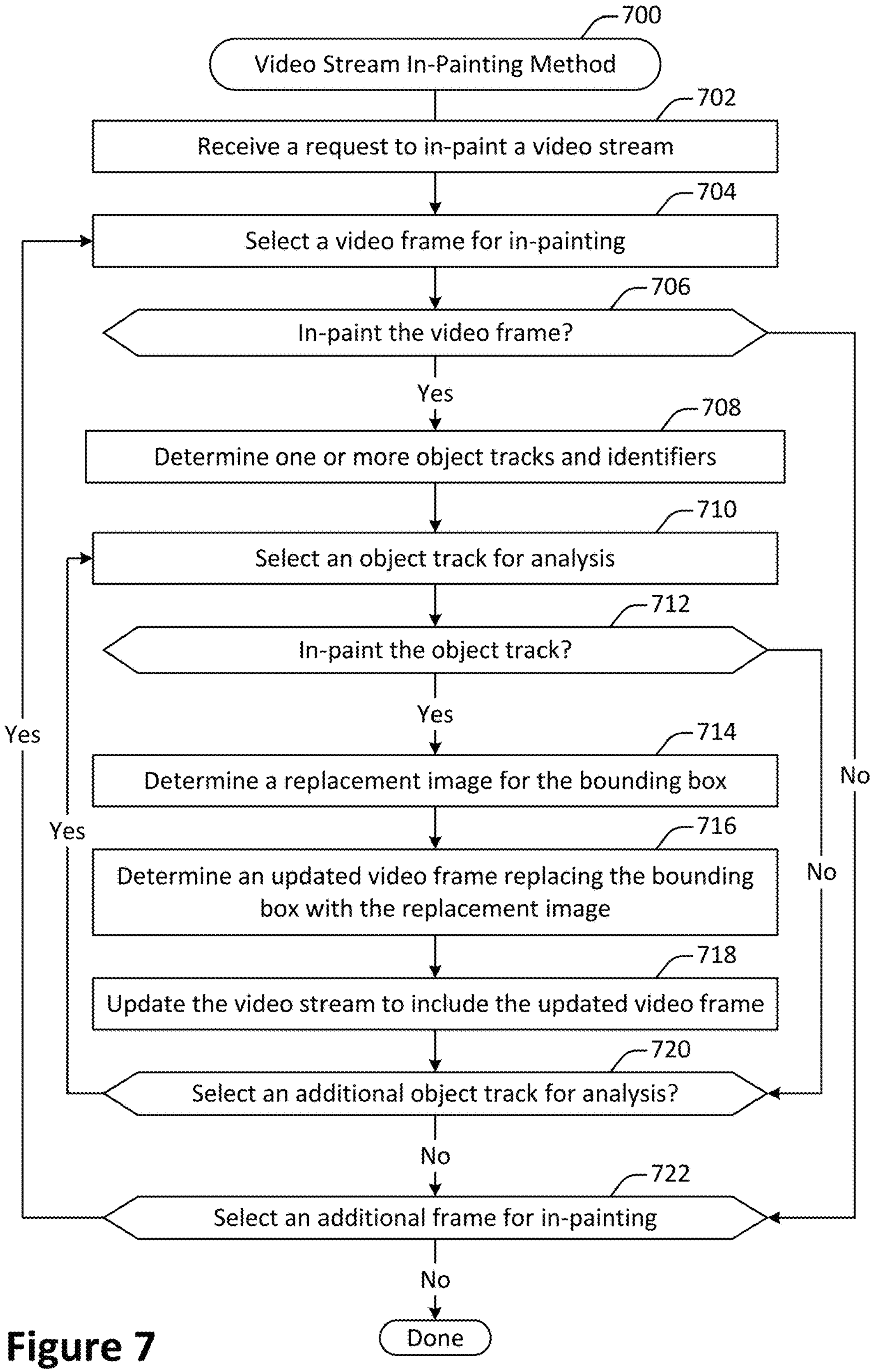
FIG. 7 illustrates an method for applying object in-painting in a video stream, performed in accordance with one or more embodiments.

FIG. 7 illustrates a method 700 for in-painting a video stream, performed in accordance with one or more embodiments. According to various embodiments, the method 700 may be performed at any suitable computing device. The method 700 may be performed in conjunction with the method 600, which may indicate whether a particular video frame is subject to in-painting.

A request to in-painting a video stream is received at 702. According to various embodiments, as discussed with respect to the operation 602, the request may be received at any suitable computing device configured for video stream monitoring. In some implementations, the request to in-paint a video stream may be generated immediately when a video stream is initialized. Alternatively, in-painting may be initiated only when a triggering condition is met, such as when a particular type of activity is detected.

A video frame for in-painting is selected at 704. According to various embodiments, each successive video frame in a video stream may be analyzed for in-painting until a terminating condition is met, as discussed with respect to the operation 722.

A determination is made at 706 as to whether to in-paint the video frame. In some implementations, the determination may be made as discussed with respect to the method 600 shown in FIG. 6.

One or more object tracks and identifiers are determined at 708. According to various embodiments, object tracks and identifiers may be determined as discussed herein, such as with respect to the methods 200, 300, and 400 shown in FIG. 2, FIG. 3, and FIG. 4.

An object track is selected for analysis at 710. According to various embodiments, object tracks may be analyzed in parallel, in sequence, or in any suitable order.

A determination is made at 712 as to whether to in-paint the object track. According to various embodiments, the determination as to whether to in-paint the object track may be made based on one or more of a variety of criteria. For example, particular people, animals, or objects may be designated for in-painting, and may be in-painted whenever they are identified. As another example, particular activities, such as those designated as private or personal, may be identified for in-painting. Then, people identified as performing such activities may be in-painted whenever they are determined to be performing those activities. As another example, particular activities, such as activities that are illegal, that are dangerous to human or animal health or well-being, and/or that violate one or more rules or regulations may be identified. Then, people performing permitted activities may be in-painted, while people performing prohibited activities may not. In this way, the privacy of people performing permitted activities may be protected, while the privacy of people performing prohibited activities may not.

In particular embodiments, one or more facial recognition algorithms may be applied to the video stream. A facial recognition algorithm may yield identification information, such as a name, associated with a particular person. Such information may be used to determine whether or not to in-paint the object track. For example, known individuals may be in-painted, while unknown individuals may not be in-painted.

In particular embodiments, the determination as to whether to in-paint an object track may be based on information from preceding video frames and/or may persist across multiple video frames. For instance, if an individual is identified and a determination is made to in-paint the individual, the individual may continue to be in-painted in successive video frames unless a triggering condition is met, such as the detection of a dangerous or prohibited activity.

A replacement images for the bounding box is determined at 714. According to various embodiments, various types of replacement images may be used. In some embodiments, a replacement image may be a blurred version of the original content of the bounding box. For example, in a security context in a public environment such as a store, the faces of individuals who are behaving normally may be blurred to protect their privacy. As another example, images of documents may be blurred to hide the contents of the documents.

In some embodiments, a replacement image may be a mask, such as a black or white region of the same shape as the bounding box. For example, a person identified as engaging in activities deemed to be private may be replaced in a video stream with a black box.

In some embodiments, a replacement image may be another object different from the original. For example, a person may be replaced with a cartoon character to indicate that a person is present at the location in the video frame without actually showing the identity of the person.

In some embodiments, a replacement image be determined based on imagery in the background. For instance, a fixed video camera may capture background imagery of a particular region. When a person moves across the field of view, they occlude the camera's view of the background imagery. However, to in-paint a track corresponding with the person, the bounding box associated with the person may be replaced with the background scenery that would be there had the person not moved across the field of view. Thus, the replacement image may be determined based at least in part on visual data selected from other video frames.

An updated video frame replacing the bounding box with the replacement image is determined at 716. In some embodiments, the updated video frame may be determined by combining the video data for the original frame with the video data for the replacement image by replacing pixel values in the region corresponding with the bounding box with corresponding pixel values in the replacement image.

The video stream is updated at 718 to include the updated video frame. According to various embodiments, updating the video stream may involve replacing the original video frame with the updated video frame. The video stream may then be stored on a storage device, transmitted to a remote computing device, displayed on a display screen, or some combination thereof. In this way, the video in-painting process may be performed at a computing device that modifies a live or pre-recorded video stream between a video stream source and a video stream recipient.

A determination is made at 720 as to whether to select an additional track for analysis. According to various embodiments, the system may continue to analyze additional tracks until all tracks identified for the video frame have been analyzed.

A determination is made at 722 as to whether to select an additional frame for in-painting. In some implementations, additional frames may continue to be selected until a terminating condition is met. For example, additional frames may continue to be selected for in-painting until the video stream terminates. As another example, additional frames may continue to be selected until user input terminating video in-painting is received. As yet another example, additional frames may continue to be selected for in-painting until a video stream no longer includes tracks or activities identified as suitable for in-painting.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventor. While various implementations have been described herein, it should be understood that they have been presented by way of example only, and not limitation. For example, some techniques and mechanisms are described herein in the context of tracking multiple objects within video streams. However, the techniques of the present invention apply to a wide variety of computer vision applications, such as tracking objects within sequences of still images. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:

determining a bounding box for an object represented in a designated frame of a live video stream, the live video stream being associated with two or more object tracks tracking two or more objects across successive frames in the live video stream;

applying an appearance-based object tracking model to the designated frame to determine a first correspondence between the bounding box and two or more comparison bounding boxes in the two or more object tracks;

applying a motion-based object tracking model to the designated frame to determine a second correspondence between the bounding and the two or more comparison bounding boxes in the two or more object tracks;

determining a plurality of performance metrics for the appearance-based object tracking model and the motion-based object tracking model based at least in part on one or more visual features within the designated frame;

selecting an object track of the two or more object tracks based on the first correspondence, the second correspondence, and the plurality of performance metrics, the object tracking being associated with a first object identifier of a plurality of object identifiers;

determining whether to in-paint the bounding box based on the first object identifier; and upon determining to in-paint the bounding box, updating the live video stream to replace the designated frame with a replacement frame, the replacement frame replacing a portion of the designated frame corresponding with the bounding box with the replacement frame.

2. The method recited in claim 1, the method further comprising:

identifying an activity being performed in the designated frame; and transmitting a message triggering an alarm when the activity being performed meets one or more alarm criteria.

3. The method recited in claim 1, wherein the first object identifier is determined based at least in part based on an object recognition algorithm applied to the designated frame.

4. The method recited in claim 1, wherein the live video stream includes audio data, and wherein the object track is selected at least in part based on one or more characteristics of the audio data.

5. The method recited in claim 1, wherein the first object identifier corresponds to a human, and wherein determining whether to in-paint the bounding box involves determining an action being performed by the human.

6. The method recited in claim 5, wherein the bounding box is in-painted upon determining that the action is an intimate or private activity.

7. The method recited in claim 6, wherein determining that the action is an intimate or private activity involves performing pose estimation for the human.

8. The method recited in claim 5, wherein determining whether to in-paint the bounding box involves determining the action being performed by the human includes determining whether the human is engaged in a dangerous or impermissible activity.

9. One or more non-transitory computer readable media having instructions stored thereon for performing a method, the method comprising:

determining a bounding box for an object represented in a designated frame of a live video stream, the live video stream being associated with two or more object tracks tracking two or more objects across successive frames in the live video stream;

applying an appearance-based object tracking model to the designated frame to determine a first correspondence between the bounding box and two or more comparison bounding boxes in the two or more object tracks;

applying a motion-based object tracking model to the designated frame to determine a second correspondence between the bounding and the two or more comparison bounding boxes in the two or more object tracks;

determining a plurality of performance metrics for the appearance-based object tracking model and the motion-based object tracking model based at least in part on one or more visual features within the designated frame;

selecting an object track of the two or more object tracks based on the first correspondence, the second correspondence, and the plurality of performance metrics, the object tracking being associated with a first object identifier of a plurality of object identifiers;

determining whether to in-paint the bounding box based on the first object identifier; and upon determining to in-paint the bounding box, updating the live video stream to replace the designated frame with a replacement frame, the replacement frame replacing a portion of the designated frame corresponding with the bounding box with the replacement frame.

10. The one or more non-transitory computer readable media recited in claim 9, the method further comprising:

identifying an activity being performed in the designated frame; and transmitting a message triggering an alarm when the activity being performed meets one or more alarm criteria.

11. The one or more non-transitory computer readable media recited in claim 9, wherein the first object identifier is determined based at least in part based on an object recognition algorithm applied to the designated frame.

12. The one or more non-transitory computer readable media recited in claim 9, wherein the live video stream includes audio data, and wherein the object track is selected at least in part based on one or more characteristics of the audio data.

13. The one or more non-transitory computer readable media recited in claim 9, wherein the first object identifier corresponds to a human, and wherein determining whether to in-paint the bounding box involves determining an action being performed by the human.

14. The one or more non-transitory computer readable media recited in claim 13, wherein the bounding box is in-painted upon determining that the action is an intimate or private activity.

15. The one or more non-transitory computer readable media recited in claim 14, wherein determining that the action is an intimate or private activity involves performing pose estimation for the human.

16. The one or more non-transitory computer readable media recited in claim 13, wherein determining whether to in-paint the bounding box involves determining the action being performed by the human includes determining whether the human is engaged in a dangerous or impermissible activity.

17. A system including a processor and memory, the system configured to perform a method comprising:

determining a bounding box for an object represented in a designated frame of a live video stream, the live video stream being associated with two or more object tracks tracking two or more objects across successive frames in the live video stream;

applying an appearance-based object tracking model to the designated frame to determine a first correspondence between the bounding box and two or more comparison bounding boxes in the two or more object tracks;

applying a motion-based object tracking model to the designated frame to determine a second correspondence between the bounding and the two or more comparison bounding boxes in the two or more object tracks;

determining a plurality of performance metrics for the appearance-based object tracking model and the motion-based object tracking model based at least in part on one or more visual features within the designated frame;

selecting an object track of the two or more object tracks based on the first correspondence, the second correspondence, and the plurality of performance metrics, the object tracking being associated with a first object identifier of a plurality of object identifiers;

determining whether to in-paint the bounding box based on the first object identifier; and upon determining to in-paint the bounding box, updating the live video stream to replace the designated frame with a replacement frame, the replacement frame replacing a portion of the designated frame corresponding with the bounding box with the replacement frame.

18. The system recited in claim 17, the method further comprising:

identifying an activity being performed in the designated frame; and transmitting a message triggering an alarm when the activity being performed meets one or more alarm criteria.

19. The system recited in claim 17, wherein the first object identifier is determined based at least in part based on an object recognition algorithm applied to the designated frame.

20. The system recited in claim 17, wherein the first object identifier corresponds to a human, and wherein determining whether to in-paint the bounding box involves determining an action being performed by the human, wherein the bounding box is in-painted upon determining that the action is an intimate or private activity, wherein determining that the action is an intimate or private activity involves performing pose estimation for the human.

* * * * *